(12) United States Patent
Feldmann

(10) Patent No.: US 7,763,088 B2
(45) Date of Patent: Jul. 27, 2010

(54) BIOMASS GASIFICATION SYSTEM

(75) Inventor: Herman Feldmann, Carbondale, IL (US)

(73) Assignee: Rentech, Inc., Los Angeles, CA (US)

( * ) Notice: Subject to any disclaimer, the term of this patent is extended or adjusted under 35 U.S.C. 154(b) by 643 days.

(21) Appl. No.: 11/691,105

(22) Filed: Mar. 26, 2007

(65) Prior Publication Data

US 2008/0022592 A1 Jan. 31, 2008

Related U.S. Application Data

(60) Provisional application No. 60/785,440, filed on Mar. 24, 2006.

(51) Int. Cl.
*C10J 3/00* (2006.01)
*C07C 4/00* (2006.01)
*F27B 15/08* (2006.01)

(52) U.S. Cl. .............. 48/209; 48/89; 48/111; 422/145; 422/146; 585/240

(58) Field of Classification Search .............. 48/203, 48/209, 127.3, 89, 111; 422/145, 146, 198, 422/202; 585/240
See application file for complete search history.

(56) References Cited

U.S. PATENT DOCUMENTS

| 4,592,762 | A | * | 6/1986 | Babu et al. ............... 48/197 R |
| 4,828,581 | A | * | 5/1989 | Feldmann et al. ......... 48/197 R |
| 4,968,325 | A |   | 11/1990 | Black et al. |
| 5,494,653 | A | * | 2/1996 | Paisley ..................... 423/652 |
| 6,613,111 | B2 | * | 9/2003 | Paisley .......................... 48/89 |
| 6,680,137 | B2 | * | 1/2004 | Paisley ......................... 429/19 |
| 6,808,543 | B2 | * | 10/2004 | Paisley ..................... 48/197 R |
| 6,972,114 | B2 | * | 12/2005 | Pope et al. ................. 422/139 |

OTHER PUBLICATIONS

International Search Report and Written Opinion for PCT Application No. PCT/US2007/07462 dated Nov. 8, 2007.

* cited by examiner

*Primary Examiner*—N. Bhat
(74) *Attorney, Agent, or Firm*—Conley Rose, P.C.

(57) ABSTRACT

A cost-effective biomass gasification method and system for converting biomass materials into gaseous fuel. The system and method are capable of converting at least about 50-70% of the carbon in a biomass material into gaseous carbon at a temperature lower than about 1300° F. Also provided is a highly-efficient, cost-effective biomass gasification system comprising a combustor and a gasifier with an inside diameter of at least about 36 inches and a height of at least about 40 feet.

17 Claims, 2 Drawing Sheets

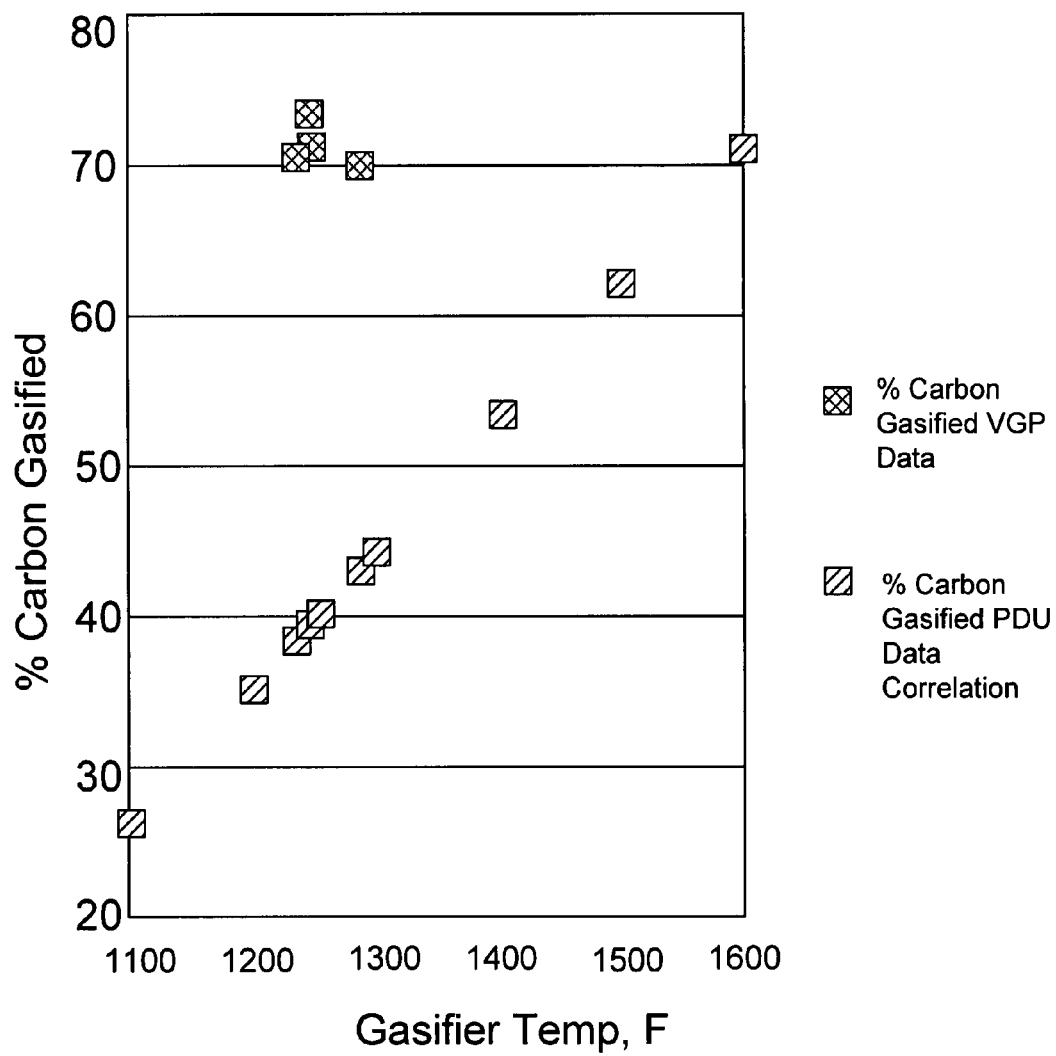
Fig. 2 VGP and PDU Data

# BIOMASS GASIFICATION SYSTEM

RELATED APPLICATION

This application claims the benefit of U.S. Provisional Patent Application No. 60/785,440, filed 24 Mar. 2006, which is herein incorporated by reference in its entirety.

TECHNICAL FIELD OF THE INVENTION

The present invention relates to the field of biomass gasification, converting biomass into gaseous fuel(s), and more specifically to the field of biomass gasification for the production of medium BTU grade fuel gas(es) from a variety of biomass forms including, among others, shredded bark, wood chips, sawdust, sludges, processed municipal solid waste, and other carbonaceous fuels or feedstocks.

BACKGROUND OF THE INVENTION

Gasification is a process by which either a solid or liquid carbonaceous material, containing mostly chemically bound carbon, hydrogen, oxygen, and a variety of inorganic and organic constituents, is reacted with air, oxygen, and/or steam. The reactions provide sufficient exothermic energy to produce a primary gaseous product containing mostly CO, $H_2$, $CO_2$, $H_2O(g)$, and light hydrocarbons laced with volatile and condensable organic and inorganic compounds.

Most of the inorganic constituents in the feedstock are either discharged as bottom ash or entrained with the raw product gas as fly-ash. Unless the raw gas is combusted immediately, it is cooled, filtered, and scrubbed with water or a process-derived liquid to remove condensables and any carry-over particles.

Alternatively, the raw gas can undergo either medium-temperature (350° C. to 400° C.) or high-temperature (up to gasifier exit temperatures) gas cleaning to provide a fuel gas that can be used in a variety of energy conversion devices, including internal combustion engines, gas turbines, and fuel cells.

Biomass when gasified with steam and/or oxygen will produce "synthesis gas," rich in CO and $H_2$, which in turn can be catalytically converted to produce high-value fuels and chemicals.

In contrast to coal, which is currently used in several commercial gasification processes, biomass is more reactive and can be effectively gasified at lower temperatures. However, unlike coal and petroleum, biomass resources are dispersed and heterogeneous in nature. Consequently, special solids handling and feeding systems have to be designed, taking into consideration the heterogeneous nature and the low bulk density of biomass. The fibrous nature of herbaceous feed stocks means they are more difficult to handle than woody biomass. Another frequently encountered problem is the low-ash fusion temperatures of certain biomass, particularly under reducing conditions, which require special care in the design and operation of biomass gasifiers.

In one attempt to provide a superior biomass gasification process, the SilvaGas gasification process was developed by Future Energy Resources Corporation FERCO, (presently SilvaGas Corporation) to provide a means to convert a range of solid biomass fuels into a medium calorific value gas that can be directly substituted for natural gas, or as an input for chemical synthesis applications. For gas turbine power applications, the use of biomass fuels from the SilvaGas process provides a means to achieve high overall power generation efficiencies without introducing additional greenhouse gases to the environment. By converting the biomass into this high energy density gaseous fuel, significantly higher power generation efficiencies were achieved relative to direct combustion based systems (approximately 40% power generation efficiency compared to a maximum of 25% with conventional biomass systems (HHV basis)).

Unlike other biomass gasification processes, the SilvaGas biomass gasification process is not based on starved air combustion, but rather rapidly heats raw biomass in an air-free environment to generate gas, and a solid residue char that is used as a heat source for the biomass heating. Significantly fewer emissions are produced in the process because not having oxygen in the gasifier makes it impossible to form dioxins if a chlorine containing feed, such as processed municipal solid waster or recycled paper pulp sludges, is used. In addition, cleaning the high energy density, medium heating value gaseous product is simplified because the gasifier product gas is much lower in volume than the gas from an "air blown" gasifier.

The process was specifically designed to take advantage of the unique properties of biomass, such as high reactivity, low ash, low sulfur, and high volatile matter. The reactivity of biomass is such that throughputs in excess of 14,600 kg/hr-m$^2$ (3000 lb/hr-ft$^2$) were achieved. In other gasification systems, throughput is generally limited to less than 500 kg/hr-m$^2$ (100 lb/hr-ft$^2$). Other competing biomass gasification processes were either developed originally for coal gasification or were heavily influenced by coal gasification technology and therefore do not take full advantage of the properties of biomass.

In the SilvaGas process, biomass is indirectly heated using a hot sand stream to produce a medium calorific value gas (approximately 17 to 19 KJ/Nm$^3$). The process uses two circulating fluidized bed reactors as the primary process vessels. One circulating fluidized bed is the gasifier in which the biomass is heated and pyrolyzed to produce a product gas which conveys the sand and residual char from gasification out of the gasifier. After separation of the sand and char from the product gas, the sand and char flow into the circulating fluidized bed process combustor where the char is completely combusted to reheat the sand for return to the combustor.

While the SilvaGas process has provided numerous advantages over conventional biomass conversion systems, there is still room for improvement. Therefore, it can be seen that a need yet exists for an enhanced biomass gasification process that provides the same level of biomass carbon converted to the desired product gas process as was achieved in the conventional SilvaGas process, but at much lower gasifier temperatures. It is to such a process that the present invention is primarily directed.

BRIEF SUMMARY OF THE INVENTION

Briefly described, in its preferred form, the present invention is an improved biomass gasification process due mainly to the novel and non-obvious design of the gasifier in the system. The invention further comprises a novel and non-obvious plant for such a process.

The present process can convert more carbon to the desired product gas than that of conventional processes, as its novel and non-obvious design parameters enables the use of lower gasifier temperatures than currently used, and thus the present process reduces gasifier heat requirements, which in turn reduces the amount of carbon needed by the combustor to generate this heat. The increase in carbon gasified plus reduced heat losses due to the lower operating temperatures increase overall system efficiency over that known in the prior art.

In a preferred embodiment, the present process comprises the steps of introducing inlet gas at a gas velocity to fluidize a bed in a gasifier vessel, and forming the bed into a fluidized bed in a first space region by means of the inlet gas. The fluidized bed contains a circulating hot, relatively fine solid bed particle component.

Next, carbonaceous material is continually input into the first space fluidized bed region where the carbonaceous material is pyrolyzed by means of the circulating hot particle component to form the product gas. The present invention utilizes the product gas formed in the first space fluid bed to entrain the gasifying carbonaceous material and solid heat transfer media particles into a lower density dilute entrained space contiguous to and above the fluidized bed containing an entrained mixture of solid heat transfer media particles, char, and carbonaceous material and the product gas, and gradually and continuously removing the entrained mixture and the product gas from the lower average density entrained space region of the gasifier to a separator. The creation of this dilute entrained space is accomplished by operating at a biomass throughput sufficiently high to generate a gas velocity at least sufficient to entrain the solid heat transfer media and gasifying carbonaceous material from the fluid bed space.

The entrained mixture is then separated from the product gas, and the entrained mixture containing solid heat transfer particles and carbonaceous char is passed through an exothermic reaction zone to add heat. In the SilvaGas process, this exothermic reaction zone is a "fast" or circulating fluidized bed combustor in which the residual char is burned to reheat the heat transfer particles, usually sand. Finally, the reheated solid particles are returned to the first space region.

The present invention provides improvements over the known SilvaGas process by utilizing a gasifier operating with its base fluidized by the injection of at least the minimum amount of gas through a distributor plate to achieve at least minimum fluidization velocity for the particular circulating solid heat transfer media employed.

In one aspect, the present invention provides a biomass gasification system comprising a combustor for heating a fluidized particulate material; and a gasifier disposed to receive a biomass feedstock and the heated fluidized particulate material, wherein the biomass feedstock comprises carbon; the heated fluidized material heats the biomass feedstock to produce a product gas; and the rate of heat transfer between the heated fluidized particulate material and the biomass feedstock is sufficient to convert at least about 50% of the carbon in the biomass feedstock into the product gas at a temperature lower than about 1300° F.

In one embodiment, at least a portion of the biomass feedstock is converted to char in the gasifier and wherein the char is transferred out of the gasifier, such as, in to the combustor and combusted to heat the fluidized particulate material. In another embodiment, at least a portion of the product gas is transferred to the combustor and combusted to heat the fluidized particulate material. In yet another embodiment, the rate of heat transfer between the heated fluidized particulate material and the biomass feedstock is sufficient to convert at least about 70% of the carbon in the biomass feedstock into the product gas at a temperature lower than about 1300° F.

The gasifier vessel of the present process preferably has an inside diameter of greater than 36 inches, and a height greater than 40 feet.

In another improvement, the present invention utilizes a gasifier with an inside diameter preferably substantially larger than the PDU (as described hereafter), which was 10 inches. The present BGP (as described hereafter) gasifier has an inside diameter of approximately 48 inches.

In another improvement, the present invention utilizes a gasifier with a height preferably substantially longer than the PDU, which was 23 feet. The present BGP gasifier has a height of 48 feet.

In another aspect, the present invention provides a biomass gasification method comprising the steps of heating a fluidized particulate material in a combustor; transferring the heated fluidized particulate material to a gasifier; and introducing a biomass feedstock to the gasifier, wherein heat from the fluidized particulate material causes the gasification of at least a portion of the biomass feedstock to form a product gas, wherein the biomass feedstock comprises carbon; and the rate of heat transfer between the heated fluidized particulate material and the biomass feedstock is sufficient to convert at least about 50% of the carbon in the biomass feedstock into the product gas at a temperature lower than about 1300° F.

Process reliability of the present invention is increased over that of the conventional processes, as both the gasifier and the combustor operate at lower temperatures, which reduces the potential for problems related to things like refractory life and other factors related to the higher temperatures.

Since the combustor of the present system can operate at reduced temperatures, feeds with lower ash fusion temperatures can be used without or at greatly reduced levels of additives required to increase ash fusion temperatures. For example, biomass energy crops, such as switch grass and sewage sludge, have low ash fusion temperatures.

The present system's design simplification results from having greater flexibility in selecting materials of construction by virtue of the reduced system operating temperatures of the component subsystems.

These and other objects, features and advantages of the present invention will become more apparent upon reading the following specification in conjunction with the accompanying drawing figures.

BRIEF DESCRIPTION OF THE FIGURES

FIG. 2 is a graph illustrating difference in gasifier efficiency between the present process and the PDU process, according to a preferred embodiment of the present invention.

DETAILED DESCRIPTION OF THE PREFERRED EMBODIMENTS

Figure 1:
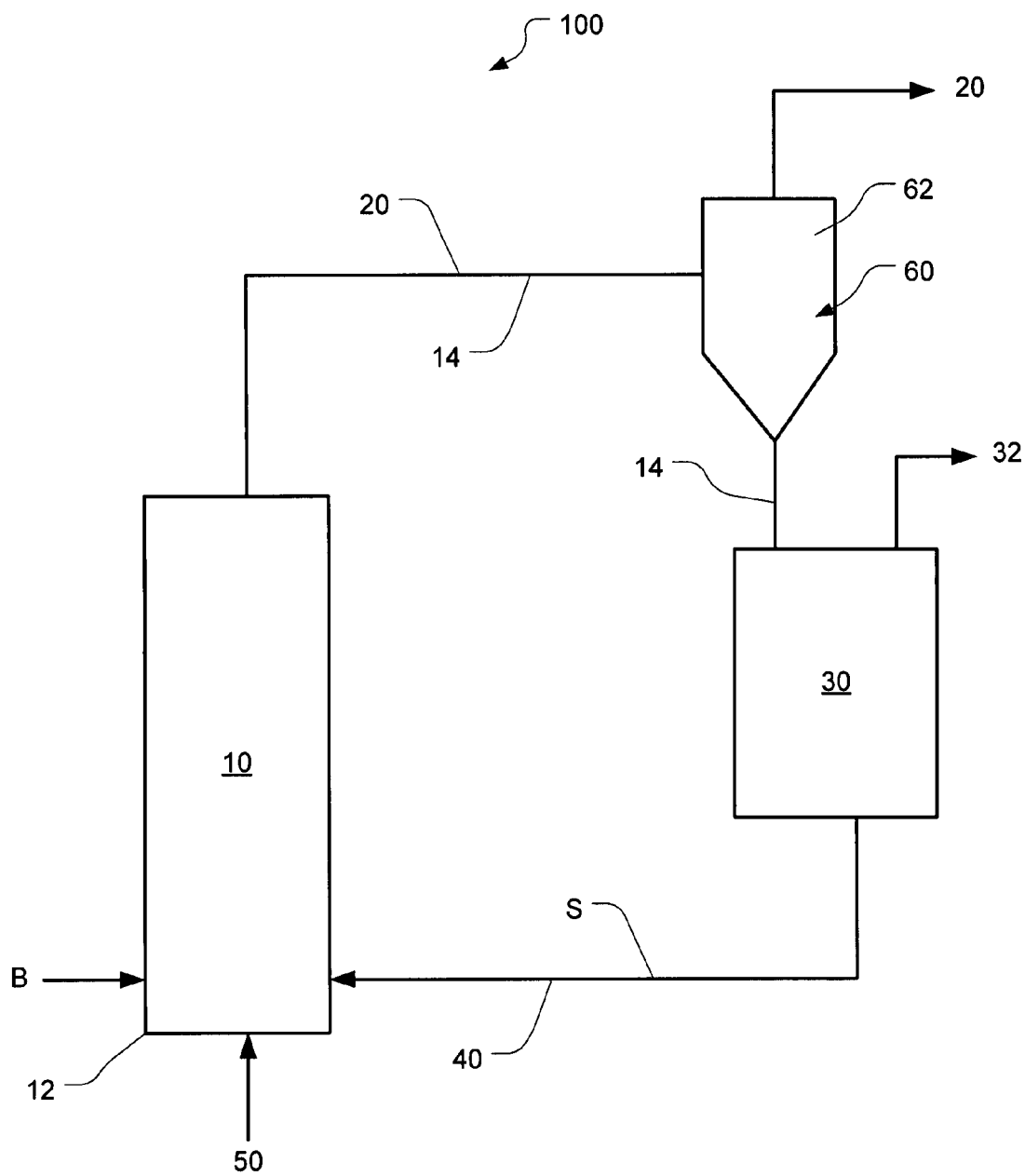
FIG. 1 is an illustration of a gasifier system according to a preferred embodiment of the present invention, shown coupled with a typical parallel entrained bed pyrolysis unit.

Recent operation of a commercial-scale plant in Burlington VT has demonstrated an unanticipated improvement in performance compared to the extensive testing in the above SilvaGas pilot plant/process development unit (PDU) operated at Battelle. Unexpectedly, the same level of biomass carbon converted to the desired product gas was achieved at much lower gasifier temperatures in the Burlington gasification plant (BGP) than were required in the PDU. Extensive analyses of the data from both the BGP and the PDU demonstrated this unanticipated finding, which provides substantial process benefits in efficiency, process reliability, feedstock flexibility, and design simplification.

Referring now in detail to the drawing figures, wherein like reference numerals represent like parts throughout the several views, FIG. 1 illustrates a system 100 incorporating the preferred reactor geometries described herein. As shown, a gasifier 10 is provided, in which the biomass B is gasified to produce a product gas 20 that is preferably substitutable for natural gas. A combustor 30 is provided, in which the char remaining after gasification is burned to provide the heat for gasification.

Heat is transferred between the two vessels 10, 30 via a stream 40 of sand S that circulates between the gasifier 10 and the combustor 30. The biomass B is fed into the base 12 of the gasifier 10, where it immediately mixes with the hot sand S at the base of the gasifier 10. The sand S at the base of the gasifier 10 is fluidized by the injection of a stream 50 of sufficient steam or other gas.

The fluidized bed provides for very rapid heat transfer between the ambient temperature biomass B and the hot sand S. The biomass gasifies in this zone, and the product gas generated entrains both the gasifying biomass and the sand heat carrier out of the gasifier 10. The char/sand mixture 14 is separated from the product gas 20 by means of cyclone separation 60. The char/sand mixture 14 then flows from the cyclone 62 down into the base of the combustor 30, where the char is burned to reheat the sand S.

The combustor 30 is a so called "fast fluid bed", which operates entrained. The char is completely burned, and the sand/ash mixture is separated from the combustion gas 32 above the combustor 30 by cyclone separators. The heated sand S, being much coarser and denser than the ash, is selectively removed in a first stage of separation. The hot sand S separated from the flue gas 32 is then returned to the base of the gasifier 10 to complete the cycle.

Burning the residual biomass char in a separate vessel prevents dilution of the product gas with combustion gases, and thereby allows it to have a higher heating value as well as one that is constant regardless of the moisture content of the wood.

The original SilvaGas process/PDU was based on the discovery that a conventional fluidized bed was not necessary to achieve high biomass carbon conversions, and that biomass gasifier capacity (defined as the amount of biomass that could be gasified per hour per unit of gasifier cross sectional area) was increased by over tenfold compared to what was achievable in the then state of the art gasifiers.

The improved performance of the present invention/BGP 100 compared to the PDU is due, quite unexpectedly, in at least one aspect to the design of the BGP gasifier 10 compared to the PDU. One major design difference is the length of the BGP gasifier 10 compared to the PDU gasifier, as well as the diameter of the gasifier 10. A number of tests in the 10 inch inner diameter PDU were conducted with baffles, which substantially increased the residence times of the wood chips in the gasifier. However, carbon gasification was not improved compared to tests without baffles. Therefore, it was assumed that the 23 foot length of the PDU gasifier was sufficient to provide all the residence time required to heat the biomass to the gasifier temperature. In other words, the wood chips in the PDU process were apparently reaching the gasifier temperature in the residence time available in the 23 foot long PDU gasifier.

It will be understood to those of skill in the art that the gasifier temperature is the temperature of the sand and gas and is generally constant over the length of the gasifier. The temperature of the wood chips, which enter the gasifier at ambient temperature, increases from ambient temperature to the temperature at which moisture in the biomass starts to evaporate, and the biomass then heats to the temperature at which they exit the gasifier. Because the PDU tests indicated that the wood chips were reaching the gasifier temperature in the gasifier residence time, increasing carbon conversion required the gasifier temperature to be increased because analyses of the PDU data indicated that the fraction of carbon gasified was a function only of gasifier temperature and that this dependence was linear.

For all the tests conducted in the PDU, the relationship between the fraction of carbon gasified and the temperature was given by the following equation:

$$X_g = 0.0009 * T_g - 0.725 \quad (1)$$

where $X_g$ is the fraction of the biomass carbon converted to gas, and $T_g$ is the measured gasifier temperature.

A difference in performance between the PDU and the BGP gasifier is shown in FIG. 2, which compares the above relationship for the PDU tests with the data points obtained in tests with wood chips in the present process 100. The difference in gasifier efficiency between the BGP and PDU gasifiers is large, and is apparent from FIG. 2.

For example, at temperatures of 1250°-1300° F., the BGP gasifier converted 70% of the feed carbon to gas, while the PDU gasifier operating at these conditions converted only 40-45% of the feed carbon to gas. It should be noted that the BGP was a commercial system, and therefore did not have the flexibility to independently change gasifier temperature as could be done in the PDU by simply adding more supplemental fuel to the PDU combustor, where natural gas was used as well as oxygen enriched air to increase gasifier temperature.

On the other hand, the BGP system was fixed because the only source of fuel for the combustor was the char from the gasified wood. Thus, in the BGP system, once the wood moisture was fixed, the gasifier temperature was fixed by a heat balance on the system. Since most of the wood chips used in testing in the BGP were approximately 20% moisture, and since operating parameters were fixed, the gasification temperature varied only a relatively small amount, between, for example, approximately 1250°-1300° F., and the fraction of wood carbon gasified remained at approximately 70%. As FIG. 2 demonstrates, over this temperature range in the PDU, the fraction of feed carbon converted to gas would only be 40-45%. The above equation (1) correlating the carbon conversion data in the PDU indicates that to achieve 70% carbon gasification in the PDU would require a temperature of 1583° F.

Table 1 illustrates the results of a heat balance applied to a SilvaGas gasifier operating under identical conditions, except for the unexpected difference in carbon gasification found between the BGP gasifier and the PDU. Thermally-balanced operation is where the system is stable and at steady state. For example, if there is not enough char entering the combustor to maintain the gasifier temperature, the gasifier temperature will fall, which reduces the fraction of biomass gasified, and increases the char entering the combustor. This will increase the heat generated in the combustor, and the system will stabilize at the point of thermal balance. This steady state condition is illustrated in Table 1.

TABLE 1

|  | BGP | PDU |
| --- | --- | --- |
| % wood moisture | 20 | 20 |
| steam rate, lb moles/lb dry wood | 0.006 | 0.006 |
| steam preheat temp, F | 360 | 360 |
| combustor air temp, F | 670 | 670 |
| % carbon gasified | 73.8 | 69.6 |
| gasifier temp, F | 1260 | 1579 |
| combustor temp, F | 1682 | 2051 |
| annual revenue advantage @ $4/MMBtu for 500 tpd plant | $440,000 | |

Table 1 illustrates that the BGP gasifier operates at much lower temperatures demonstrating many of the below enumerate benefits over the conventional art.

More carbon can be converted to the desired product gas because the lower gasifier temperatures reduce gasifier heat requirements which reduces the amount of carbon needed by the combustor to generate this heat. The increase in carbon gasified plus reduced heat losses due to the lower operating temperatures increase overall system efficiency. The reduced heat loss was not taken into account in the above calculations so the advantage would be even greater.

Process reliability will increase because both gasifier and combustor operate at lower temperatures which reduces the potential for problems related to things like refractory life and other factors related to the higher temperatures.

Because the combustor can operate at reduced temperatures, feeds with lower ash fusion temperatures can be used without or at greatly reduced levels of additives required to increase ash fusion temperatures. For example biomass energy crops such as switch grass and sewage sludge have low ash fusion temperatures.

Design simplification will result from having greater flexibility in selecting materials of construction by virtue of the reduced system operating temperatures.

The impact on plant revenues due to higher gas production shown in Table 1 for a 500 ton/day plant is substantial.

Thus, the operations conducted in Burlington demonstrated major improvements over the PDU. These improvements were a result of factors not anticipated by PDU testing. While at first blush, it might appear that the increased residence time in the 48 foot BGP gasifier was the reason for the improved performance, this is not borne out by the tests done in the PDU with baffles. These baffles substantially increased residence time with not even an incremental improvement in performance leading to the (at that time) completely justified conclusion that the biomass was reaching the gasifier temperature in the 23 foot, 10 inch inner diameter gasifier.

To explain the reason for the unexpected improved performance, it is necessary to again consider what happens to a wood chip as it passes through the gasifier. In both the PDU and the BGP gasifiers, gasifier temperatures were essentially constant over the length of the gasifier. It is important to point out that the only temperature that can be measured is the gasifier temperature, which is essentially the temperature of the sand/gas mixture flowing through the gasifier. This is because the thermal mass of the sand heat transfer agent is much higher than that of both the biomass feed and the product gas. The rapid heat transfer between the fine sand particles and gas insures they are essentially at the same temperature.

On the other hand, it is evident that the temperature of a wood chip changes throughout the gasifier. It enters at ambient temperature, heats up to a temperature at which moisture evaporates (which occurs at constant temperature), and then continues to heat until it leaves the gasifier or reaches the gasifier temperature.

The total heat that can be transferred to the chip is given by the rate of heat transfer times residence time (Btu/sec)×(sec). The residence time is only one parameter in this equation, the other is the rate of heat transfer. Because the PDU tests with baffles demonstrated that substantial increases in residence time did not have an appreciable effect on the amount of carbon gasified, it means that the rate of heat transfer is substantially higher in the BGP gasifier than in the PDU.

One explanation for this is to qualitatively consider the factors affecting the relative heat transfer in the gasifier. The base of the gasifier contains a conventional fluidized bed into which the ambient temperature biomass is fed. In this conventional fluid bed, the biomass dries and gasifies sufficiently to generate enough product gas to entrain the biomass and sand where they flow through the gasifier in a very dilute phase. For example, the volume fraction of sand in this dilute phase is only on the order of 2 vol. % (see, "Fluidization and Fluid Particle Systems" by Zenz and Othmer, Reinhold Chemical Engineering Series, pp 330-331), so each sand particle is surrounded by gas with few sand particles as neighbors. For this reason, while the rate of heat transfer between the gas and the very fine (compared to the biomass) sand particles is high, the rate of heat transfer between the biomass and the sand/gas mixture is much lower than in the fluidized bed, which is characterized by very high rates of heat transfer.

Thus, it is believed that the vast improvement in performance of the BGP gasifier compared to the PDU is due in some part to the much higher rate of heat transfer in the BGP gasifier, much more than any the increases in residence time. The explanation for the higher rate of heat transfer can be explained by considering flow patterns in the dilute entrained phase above the vigorously fluidized base of the gasifier.

The flow patterns in the entrained phase are not unidirectional. For example while the net flow of particles and biomass is up, there also exists a downward flowing stream of solids along the gasifier walls. This downward flowing solids stream will reenter the fluidized zone and be re-entrained. However, in reentering the fluidized zone, the solids, which include partially gasified biomass, experience the much higher heat transfer rates typical of fluidized beds. Therefore, it appears that the down flow of solids (particles+biomass) is greater in the BGP gasifier than in the PDU.

Another possibility is the increased heat transfer rates in the dilute phase brought about by increased eddy formation in the larger diameter gasifier. Still another possibility is that the fluidized zone in the BGP gasifier occupies a larger fraction of the gasifier volume. By whatever mechanism, the higher heat transfer rates between biomass and the sand in the BGP gasifier result in the biomass reaching the temperature required for thermally-balanced operation at a much lower gasifier temperature than was required to achieve the same temperature in the PDU.

While the invention has been disclosed in its preferred forms, it will be apparent to those skilled in the art that many modifications, additions, and deletions can be made therein without departing from the spirit and scope of the invention and its equivalents as set forth in the following claims.

What is claimed is:

1. A biomass gasification system comprising:
    a combustor for heating a fluidized particulate material; and
    a gasifier disposed to receive the heated fluidized particulate material and a biomass feedstock comprising carbon,
    whereby the heated fluidized material heats the biomass feedstock to produce a product gas; and
    wherein the gasifier has a height of at least about 40 feet and an inside diameter of at least about 36 inches and is configured such that a fraction, $X_g$, of carbon in the biomass feedstock greater than 0.009 times the gasifier temperature (° F.) minus 0.725 is converted into the product gas.

2. The biomass gasification system of claim 1, wherein the gasifier is configured to convert at least a portion of the biomass feedstock to char and wherein the system is configured for transfer of the char out of the gasifier.

3. The biomass gasification system of claim 2, wherein the system is configured to transfer at least a portion of the char to the combustor and wherein the combustor is configured to combust the char to heat the fluidized particulate material.

4. The biomass gasification system of claim 1, wherein the system is configured to transfer at least a portion of the product gas to the combustor and wherein the combustor is configured to combust the product gas to heat the fluidized particulate material.

5. The biomass gasification system of claim 1 wherein $X_g$ is greater than 0.5 at a temperature of less than about 1300° F.

6. The biomass gasification system of claim 5, wherein $X_g$ is at least about 0.7 at a temperature lower than about 1300° F.

7. A biomass gasification method comprising the steps of:
heating a fluidized particulate material in a combustor;
transferring the heated fluidized particulate material to a gasifier operating at a gasifier temperature of less than about 1300° F.; and
introducing a biomass feedstock comprising carbon to the gasifier and converting, via heat transfer from the fluidized particulate material, a fraction, $X_g$, of carbon in the biomass feedstock greater than 0.0009 times the gasifier temperature (° F.) minus 0.725 into product gas.

8. The biomass gasification method of claim 7, wherein at least a portion of the biomass feedstock is converted to char in the gasifier and wherein the method further comprises transferring the char out of the gasifier.

9. The biomass gasification method of claim 8, further comprising transferring at least a portion of the char to the combustor wherein it is combusted to heat the fluidized particulate material.

10. The biomass gasification method of claim 9, wherein substantially no fuel other than char, a portion of the product gas, or both is added to the combustor.

11. The biomass gasification method of claim 7, further comprising transferring at least a portion of the product gas to the combustor wherein it is combusted to heat the fluidized particulate material.

12. The biomass gasification method of claim 7, further comprising converting at least about 70% of the carbon in the biomass feedstock into the product gas.

13. The biomass gasification method of claim 7, wherein the inside diameter of the gasifier is at least about 36 inches, wherein the height of the gasifier is at least about 40 feet, or both.

14. The biomass gasification method of claim 7 wherein $X_g$ is at least about 0.5.

15. A biomass gasification system comprising:
a combustor for heating a fluidized particulate material; and
a gasifier constructed to operate at temperatures up to, but not exceeding, 1300° F. and disposed to receive a biomass feedstock and the heated fluidized particulate material,
wherein the heated fluidized material heats the biomass feedstock to produce a product gas.

16. The biomass gasification system of claim 15 wherein the inside diameter of the gasifier is at least about 36 inches and the height of the gasifier is at least about 40 feet.

17. The biomass gasification system of claim 15 wherein the diameter and height of the gasifier are such that, during gasification, eddy formation, downward flow of solids along the gasifier walls from a dilute entrained phase contiguous with and located above a fluidized zone within the gasifier to said fluidized zone, or both are such that thermally-balanced operation at a fraction carbon conversion, $X_g$, of at least 0.7 is obtainable with a gasifier temperature of less than or equal to about 1300° F.

* * * * *

UNITED STATES PATENT AND TRADEMARK OFFICE
CERTIFICATE OF CORRECTION

PATENT NO. : 7,763,088 B2
APPLICATION NO. : 11/691105
DATED : July 27, 2010
INVENTOR(S) : Herman Feldmann It is certified that error appears in the above-identified patent and that said Letters Patent is hereby corrected as shown below:

In claim 1, please replace "0.009" with "0.0009" as shown below:

1. A biomass gasification system comprising:
 a combustor for heating a fluidized particulate material; and
 a gasifier disposed to receive the heated fluidized particulate material and a biomass feedstock comprising carbon, whereby the heated fluidized material heats the biomass feedstock to produce a product gas; and wherein the gasifier has a height of at least about 40 feet and an inside diameter of at least about 36 inches and is configured such that a fraction, Xg, of carbon in the biomass feedstock greater than [[0.009]] 0.0009 times the gasifier temperature (°F) minus 0.725 is converted into the product gas.

Signed and Sealed this

Thirtieth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,763,088 B2 | Page 1 of 1 |
| APPLICATION NO. | : 11/691105 | |
| DATED | : July 27, 2010 | |
| INVENTOR(S) | : Herman Feldmann | |

It is certified that error appears in the above-identified patent and that said Letters Patent is hereby corrected as shown below:

In claim 1, please replace "0.009" with "0.0009" as shown below:

Column 8, lines 50-63 should read
1. A biomass gasification system comprising:
 a combustor for heating a fluidized particulate material; and
 a gasifier disposed to receive the heated fluidized particulate material and a biomass feedstock comprising carbon, whereby the heated fluidized material heats the biomass feedstock to produce a product gas; and wherein the gasifier has a height of at least about 40 feet and an inside diameter of at least about 36 inches and is configured such that a fraction, Xg, of carbon in the biomass feedstock greater than [[0.009]] 0.0009 times the gasifier temperature (°F) minus 0.725 is converted into the product gas.

This certificate supersedes the Certificate of Correction issued November 30, 2010.

Signed and Sealed this
Twenty-fifth Day of January, 2011

David J. Kappos
*Director of the United States Patent and Trademark Office*